July 2, 1929.  F. B. McKINNEY ET AL  1,719,516
AUTOMOBILE BRAKE TESTER
Filed July 22, 1927
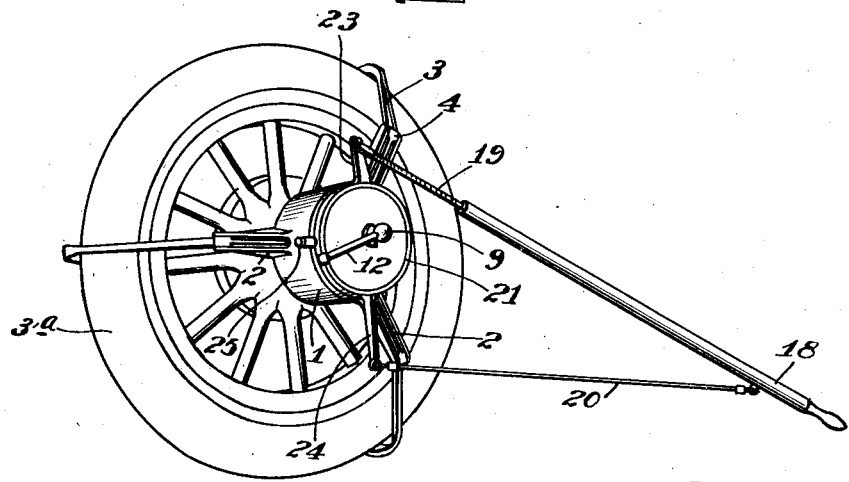
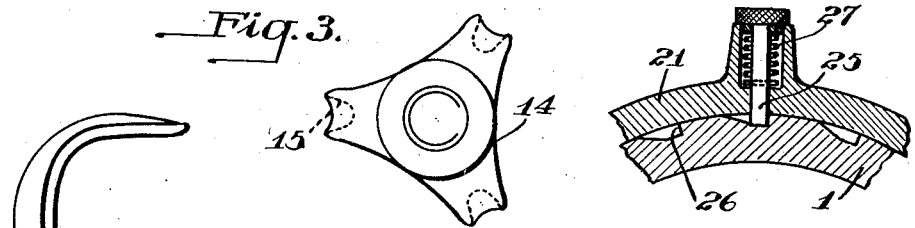
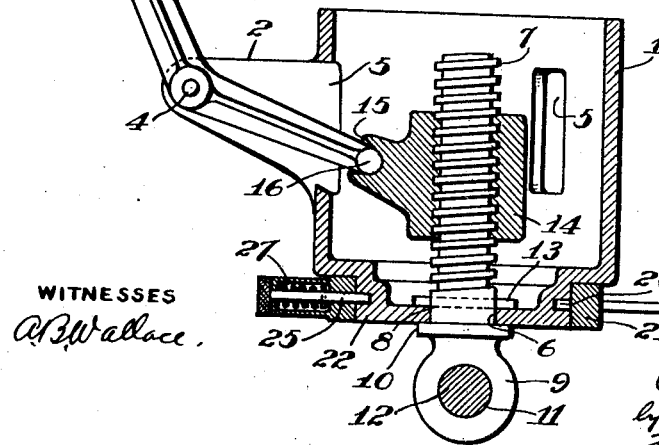

Patented July 2, 1929.

1,719,516

UNITED STATES PATENT OFFICE.

FRANCIS B. McKINNEY, OF BALDWIN TOWNSHIP, ALLEGHENY COUNTY, AND CHARLES H. ALLEN, OF PITTSBURGH, PENNSYLVANIA, ASSIGNORS TO AUTO BRAKEOMETER CORPORATION, OF PITTSBURGH, PENNSYLVANIA, A CORPORATION OF PENNSYLVANIA.

AUTOMOBILE BRAKE TESTER.

Application filed July 22, 1927. Serial No. 207,666.

This invention relates to brake testing devices and is an improvement on the automobile brake testing device shown and described in United States Patent No. 1,654,136, issued December 27, 1927.

One object of the present invention is to provide improved clamping means for engaging the wheel carrying the brake to be tested, which means shall be adapted to cooperate with a testing device of the type disclosed in the aforementioned copending application.

Another object of this invention is to provide an automobile brake testing mechanism in which the improved clamping element for engaging the wheel of the vehicle shall be especially formed to cooperate with a torque applying and measuring device so as to make the wheel to which it is joined completely rotatable through the torque applying and measuring device, without necessitating the removal or readjustment of the clamping element.

Another object of the invention is to provide a device of the above designated character which during use shall be capable of ready and quick application to and removal from the wheel of the vehicle without necessitating rearrangement of the gage member.

In the accompanying drawings constituting a part hereof and in which like reference characters designate like parts Fig. 1 is a view in perspective of one embodiment of a brake testing device, attached to a wheel, and embodying the principle of this invention; Fig. 2 a cross sectional view thereof partly in elevation; Fig. 3 a plan view of the adjustable member cooperating with the clamping device; and Fig. 4 a detailed view of the ratchet mechanism which permits of relative movement of the torque applying and measuring device with respect to the clamping element; and Fig. 5 is a fragmentary view, partly in section, of the torque applying and measuring device.

Referring to the figures of the drawings the structure therein illustrated comprises a cylindrical housing 1 having radially projecting lugs 2 formed integrally therewith, the lugs comprising bifurcated brackets for receiving clamping arms 3 pivoted at 4 thereto and which project through slotted openings 5 in the casing member 1 as shown in Fig. 2. The casing 1 is open at one end and closed at the other, the open end being adapted to be disposed over the hub of a wheel $3^a$ in the manner shown in Fig. 1. The closed end of the casing is provided with a central opening 6 which is adapted to receive an adjusting screw 7 having a body milled portion 8 which is journalled in the opening 6 of the casing to be rotatable therein. The screw 7 is provided with a head 9 having a shoulder portion 10 and an opening 11 for a handle member 12. A pin 13 projects through the screw on the inner side of the casing member to hold the screw against axial movement therein.

A spider or nut element 14 having a screw thread portion corresponding to the threads of screw 7 is adapted to interact with the latter for axial movement thereon subject to rotation of the screw. The spider is formed as shown in Fig. 3 and is provided with recesses 15 which constitute sockets for receiving the rounded ends 16 of the clamping arms 3. Upon rotation of screw member 7, the spider 14 moves thereon, simultaneously actuating arms 3, which swing pivotally at pivot 4. The movement of the arms 3 is such as to firmly engage the wheel member shown in Fig. 1 when the spider travels in the direction of the closed end of the casing and to release the wheel when rotation of the screw is reversed.

The torque applying and measuring device is similar to that disclosed in the aforementioned patent and comprises a hand lever 18 and a rod 19. As seen in Figs. 1 and 5, the lever is provided interiorly with a bushing 8 near its open end and with a second bushing 29 intermediate its ends, through which rod 19 is movable. Bushing 28 acts as a stop for a collar 30 secured in fixed position on the rod, and a calibrated spring 31 is seated between this collar and the bushing 29. The manner in which the gage is attached in cooperative relation with the clamping element permits of manipulating the gage member to rotate the wheel without releasing the clamping element each time the lever member has been displaced to its utmost position. The connecting means for the torque applying and measuring device comprises a ring member 21 which is loosely fitted on the shoulder portion 22 of the casing 1. The ring is provided with lugs or arms 23 and 24 to which the collapsible member 19 and the rod 20 of the gage element are pivotally secured. The ring member 21 is provided with a ratchet pin 25 which cooperates with slots 26 provided in the casing member in the manner shown in Fig. 4. The pin 25 is biased by a coil spring 27 to seat on the bottom of the slots 26 and the latter are cut out in the manner shown in Fig. 4 to permit the ring to move freely over the casing 1 in one direction, and to render the ring and casing jointly movable in the opposite direction, which latter is the direction in which the tension gage is operative during the testing operation.

In the application of the mechanism for testing a brake adjustment, the torque applying and measuring device is removed by withdrawing ratchet pin 25. The screw 7 is rotated to pivot the arms 3 outwardly on their supports until they have been expanded to the proper distance for engaging the wheel of the brake to be tested. The screw mechanism is then rotated in the reverse direction to engage the clamping arm with the wheel periphery to render the clamp rotatable with the wheel.

The torque applying and measuring device is then placed on the shoulder portion 22 of the casing and the pin 25 is forced by action of its spring into one of the notches 26 of the casing member. The wheel is rotated by lifting the lever handle 18 and the leverage required to rotate the wheel is registered in any desired units on a scale marked on the collapsible member 19 which acts against the calibrated spring disposed within the lever 18. The object of the brake testing gage is to determine the brake resistance for a particular adjustment of the brake or its actuating parts, this resistance being measured in terms of the force applied to the lever 18. It is of course desirable to rotate the wheel continuously in the same direction against the resistance of the brake, in order to determine whether the brake resistance is uniform during a complete revolution of the wheel. Accordingly when the lever 18 reaches its uppermost position it must be repositioned with respect to the clamping member and on account of ratchet pin 25 it is only necessary to lower the lever handle to bring the pin to a new position of engagement with the casing, whereupon the wheel may be rotated through the next section, or arc, by exerting an upward pressure on handle 18, this sequence of operation being repeated as many times as necessary or desirable.

It is evident from the foregoing description of this invention that a clamping device cooperating with a torque applying and measuring device in the manner herein set forth provides a simple and efficient means for measuring and standardizing brake adjustments by a single setting of the clamp to the wheel member.

According to the provisions of the patent statutes, we have explained the principle and operation of our invention and have illustrated and described what we now consider to represent its best embodiment. However, we desire to have it understood that, within the scope of the appended claims, the invention may be practiced by other forms of construction than that particularly illustrated and described.

We claim:

1. A brake testing mechanism for automobiles, comprising a wheel clamp including a casing and a plurality of wheel-engaging arms pivotally mounted in said casing, and a screw and nut mechanism disposed in said casing for moving said arms simultaneously to and from the wheel-engaging position, a torque applying and measuring device, and connections between said device and clamp for causing the device to act upon the clamp when the device is turned in one direction, said connections permitting the device to move freely with relation to the clamp when the device is turned in a reverse direction.

2. A brake testing mechanism for automobiles, comprising a wheel clamp including a casing provided with lugs and a plurality of wheel-engaging arms pivotally mounted on said lugs, a rotatable screw axially disposed in said casing, and a nut mounted on said screw to engage said wheel-engaging arms and adapted to engage said arms to move them simultaneously to and from wheel-engaging position, a torque applying and measuring device, and connections between said device and clamp for causing the device to act upon the clamp when the device is turned in one direction, said connections permitting the device to move freely with relation to the clamp when the device is turned in a reversed direction.

3. A brake testing mechanism for automobiles, comprising a wheel clamp including a casing provided with bifurcated lugs integral therewith and extending radially therefrom, a plurality of wheel-engaging arms pivotally mounted on said lugs and projecting into said casing, a rotatable screw axially mounted in said casing, and a spider having a threaded portion engaging said screw and further adapted to engage the inwardly projecting ends of said wheel-engaging arms to move them simultaneously to and from wheel-engaging position, a torque applying and measuring device, and connections between said device and clamp for causing the device to act upon the clamp when the device is turned in one direction, said connections permitting the device to move freely with relation to the clamp when the device is turned in a reverse direction.

4. A brake testing mechanism for automobiles, comprising a wheel clamp including a casing and a plurality of wheel-engaging arms movably borne by the casing, means for moving said arms simultanenously to and from the wheel-engaging position, a ring mounted for rotation on said casing, a torque applying and measuring device attached to said ring, and a ratchet pawl acting between said ring and clamp for causing the device to act upon the clamp when the device is turned in one direction, said ratchet pawl permitting the device to move freely with relation to the clamp when the device is turned in a reverse direction.

5. A brake testing mechanism for automobiles, comprising a wheel clamp including a casing and a plurality of wheel-engaging arms movably borne by the casing, means for moving said arms simultaneously to and from the wheel-engaging position, a torque-applying and measuring device including an oscillatory power-applying arm, and connections between said device and clamp for causing the device to act upon the clamp when the arm is moved in one direction and to permit the device to move freely with relation to the clamp when the arm is moved in a reverse direction.

In testimony whereof, we hereunto sign our names.

FRANCIS B. McKINNEY.
CHARLES H. ALLEN.